US008217992B2

(12) United States Patent
Bewersdorf et al.

(10) Patent No.: US 8,217,992 B2
(45) Date of Patent: *Jul. 10, 2012

(54) MICROSCOPIC IMAGING TECHNIQUES

(75) Inventors: Joerg Bewersdorf, Bar Harbor, ME (US); Michael Darin Mason, Orrington, ME (US); Sam T. Hess, Stillwater, ME (US)

(73) Assignees: The Jackson Laboratory, Bar Harbor, ME (US); University of Maine, Orono, ME (US)

( * ) Notice: Subject to any disclaimer, the term of this patent is extended or adjusted under 35 U.S.C. 154(b) by 1217 days.

This patent is subject to a terminal disclaimer.

(21) Appl. No.: 12/008,661

(22) Filed: Jan. 11, 2008

(65) Prior Publication Data

US 2010/0283835 A1 Nov. 11, 2010

Related U.S. Application Data

(60) Provisional application No. 60/879,833, filed on Jan. 11, 2007.

(51) Int. Cl.
*H04N 13/02* (2006.01)
(52) U.S. Cl. ............... 348/47; 348/46; 348/79; 348/50; 359/389; 359/385; 359/363; 359/368; 250/458.1; 250/459.1
(58) Field of Classification Search .................. 348/79, 348/50, 47, 46
See application file for complete search history.

(56) References Cited

U.S. PATENT DOCUMENTS

| 4,621,911 A | 11/1986 | Lanni et al. ............... 350/524 |
| 4,748,980 A | 6/1988 | Cremer et al. ............. 128/303.1 |
| 5,731,588 A | 3/1998 | Hell et al. ................. 250/458.1 |
| 5,777,732 A | 7/1998 | Hanninen et al. ............ 356/318 |
| 5,851,052 A | 12/1998 | Gustafsson .................. 297/16.2 |
| 5,888,734 A | 3/1999 | Cremer et al. .................... 435/6 |
| 5,922,543 A | 7/1999 | Cremer ............................ 435/6 |
| 6,005,916 A | 12/1999 | Johnson et al. ................. 378/87 |
| 6,033,916 A | 3/2000 | Sieben et al. ................. 436/518 |
| 6,135,557 A | 10/2000 | Gustafsson ............. 297/344.18 |
| 6,210,977 B1 | 4/2001 | Sieben et al. ................. 436/518 |
| 6,262,423 B1 | 7/2001 | Hell et al. .................. 250/458.1 |
| 6,337,472 B1 | 1/2002 | Garner et al. ............. 250/201.3 |

(Continued)

FOREIGN PATENT DOCUMENTS

EP 0 491 289 6/1992

(Continued)

OTHER PUBLICATIONS

Jörg Bewersdorf, Rainer Pick, Stefan W. Hell,*Multifocal Multiphoton Microscopy*. Optics Letters, vol. 23 No. 9, 655-657 (May 1, 1998) (3 pages).

(Continued)

*Primary Examiner* — Jude Jean Gilles
(74) *Attorney, Agent, or Firm* — Nixon Peabody LLP (57) ABSTRACT

A method of performing 3D photoactivation microscope imaging includes providing a sample having a plurality of probes, each of the plurality of probes including a photoactivatable material. Probes from the plurality of probes are activated to form a sparse subset of probes, the sparse subset of probes having probes that are spatially separated by at least a microscope resolution. The sample is illuminated with a readout light source, and light emitted from activated probes is detected. Based on the light emission detected from the activated probes, localized three-dimensional positions of the activated probes are obtained.

27 Claims, 4 Drawing Sheets

U.S. PATENT DOCUMENTS

| | | |
|---|---|---|
| 6,424,421 B1 | 7/2002 | Cremer et al. ............... 356/620 |
| 6,608,717 B1 | 8/2003 | Medford et al. ............. 359/368 |
| RE38,307 E | 11/2003 | Gustafsson et al. .......... 359/385 |
| 6,909,105 B1 | 6/2005 | Heintzmann et al. ..... 250/599.04 |
| 6,934,079 B2 | 8/2005 | Hell et al. .................... 359/368 |
| 7,009,700 B2 | 3/2006 | Dubois et al. ................ 356/317 |
| 7,064,824 B2 | 6/2006 | Hell ............................. 356/317 |
| 7,105,795 B2 | 9/2006 | Cartlidge et al. .......... 250/208.1 |
| 7,115,885 B2 | 10/2006 | Hell ........................... 250/459.1 |
| 7,151,246 B2 | 12/2006 | Fein et al. .................. 250/208.1 |
| 7,154,598 B2 | 12/2006 | Montagu et al. ............. 356/244 |
| 7,253,408 B2 | 8/2007 | West ............................ 250/309 |
| 7,253,893 B2 | 8/2007 | Hell et al. .................... 356/317 |
| 7,256,894 B2 | 8/2007 | Chen et al. ................... 356/497 |
| 7,298,461 B2 | 11/2007 | Cremer et al. ................. 356/73 |
| 7,772,569 B2* | 8/2010 | Bewersdorf et al. ....... 250/458.1 |
| 7,880,149 B2* | 2/2011 | Bewersdorf et al. ....... 250/458.1 |
| 7,991,859 B1* | 8/2011 | Miller et al. ................. 709/220 |
| 2002/0023979 A1 | 2/2002 | Gustafsson .................. 242/290 |
| 2002/0030811 A1 | 3/2002 | Schindler ..................... 356/318 |
| 2004/0114138 A1 | 6/2004 | Hell ............................. 365/318 |
| 2004/0133112 A1 | 7/2004 | Rajadhyaksha .............. 600/476 |
| 2004/0207854 A1 | 10/2004 | Hell et al. .................... 356/450 |
| 2004/0212799 A1 | 10/2004 | Hell ............................. 356/317 |
| 2005/0036667 A1 | 2/2005 | So et al. ....................... 382/128 |
| 2005/0053034 A1* | 3/2005 | Chiueh ......................... 370/331 |
| 2005/0094261 A1 | 5/2005 | Hell et al. .................... 359/368 |
| 2005/0238118 A1 | 10/2005 | Asraf et al. .................. 375/316 |
| 2005/0259008 A1 | 11/2005 | Gustafsson ............ 343/700 MS |
| 2006/0038993 A1 | 2/2006 | Hell ............................. 356/318 |
| 2006/0044985 A1 | 3/2006 | Hell ............................. 369/100 |
| 2006/0050146 A1 | 3/2006 | Richardson .................... 348/80 |
| 2006/0256338 A1 | 11/2006 | Gratton et al. ............... 356/417 |
| 2007/0047287 A1 | 3/2007 | Hell et al. .................... 365/129 |
| 2007/0065936 A1 | 3/2007 | Hasegawa et al. ......... 435/288.7 |
| 2007/0069940 A1 | 3/2007 | Gustafsson ...................... 342/1 |
| 2007/0109555 A1 | 5/2007 | Gustafsson et al. .......... 356/517 |
| 2007/0118879 A1* | 5/2007 | Yeun ............................... 726/3 |
| 2007/0160175 A1 | 7/2007 | Lang ............................ 376/103 |
| 2009/0242798 A1* | 10/2009 | Bewersdorf et al. ....... 250/458.1 |
| 2010/0246443 A1* | 9/2010 | Cohn et al. ................... 370/255 |
| 2010/0265318 A1* | 10/2010 | Bewersdorf et al. ........... 348/46 |
| 2011/0022711 A1* | 1/2011 | Cohn ........................... 709/225 |

FOREIGN PATENT DOCUMENTS

| | | |
|---|---|---|
| EP | 0 500 673 A1 | 9/1992 |
| EP | 0 523 157 A1 | 1/1993 |
| EP | 0 491 289 B1 | 4/1996 |
| EP | 0 783 428 A1 | 7/1997 |
| EP | 0 898 783 A2 | 3/1999 |
| EP | 0 898 783 B1 | 3/1999 |
| EP | 0 946 855 B1 | 10/1999 |
| EP | 0 996 854 A1 | 5/2000 |
| EP | 1 008 845 A1 | 6/2000 |
| EP | 1 024 731 A1 | 8/2000 |
| EP | 1 157 297 B1 | 11/2001 |
| EP | 1 166 629 A1 | 1/2002 |
| EP | 1 359 452 A1 | 11/2003 |
| EP | 1 359 452 B1 | 11/2003 |
| EP | 1 377 816 A1 | 1/2004 |
| EP | 1 436 597 A1 | 7/2004 |
| EP | 1 444 503 B1 | 8/2004 |
| EP | 1 500 202 A1 | 1/2005 |
| EP | 1 616 216 A2 | 1/2006 |
| EP | 1 616 344 A2 | 1/2006 |
| EP | 1 676 121 A1 | 7/2006 |
| EP | 1 756 910 A1 | 2/2007 |
| GB | 2 416 261 A | 1/2006 |
| JP | 2006-084960 | 3/2006 |
| WO | WO 91/06220 A1 | 5/1991 |
| WO | WO 91/15547 A1 | 10/1991 |
| WO | WO 95/21393 A2 | 8/1995 |
| WO | WO 95/21393 A3 | 8/1995 |
| WO | WO 95/30166 A1 | 11/1995 |
| WO | WO 96/06003 A1 | 2/1996 |
| WO | WO 98/28592 A1 | 7/1998 |
| WO | WO 98/28775 A2 | 7/1998 |
| WO | WO 98/28775 A3 | 7/1998 |
| WO | WO 98/37231 A1 | 8/1998 |
| WO | WO 99/02974 | 1/1999 |
| WO | WO 99/02974 A1 | 1/1999 |
| WO | WO 99/20156 A1 | 4/1999 |
| WO | WO 00/33608 A2 | 6/2000 |
| WO | WO 00/35317 A1 | 6/2000 |
| WO | WO 00/52512 A1 | 9/2000 |
| WO | WO 02/05446 A1 | 1/2002 |
| WO | WO 02/084265 A1 | 10/2002 |
| WO | WO 03/040706 A1 | 5/2003 |
| WO | WO 03/093892 A1 | 11/2003 |
| WO | WO 03/094372 A1 | 11/2003 |
| WO | WO 2004/090617 A2 | 1/2004 |
| WO | WO 2004/090617 A3 | 1/2004 |
| WO | WO 2004/090950 A2 | 10/2004 |
| WO | WO 2004/090950 A3 | 10/2004 |
| WO | WO 2005/006849 A1 | 1/2005 |
| WO | WO 2005/033679 A1 | 4/2005 |
| WO | WO 2005/093391 A1 | 10/2005 |
| WO | WO 2005/114784 A1 | 12/2005 |
| WO | WO 2006/091162 A1 | 8/2006 |
| WO | WO 2006/100013 A2 | 9/2006 |
| WO | WO/2006/100013 A3 | 9/2006 |
| WO | WO 2006/103025 A1 | 10/2006 |
| WO | WO 2006/114247 A1 | 11/2006 |
| WO | WO 2006/118508 A1 | 11/2006 |
| WO | WO 2006/127692 A2 | 11/2006 |
| WO | WO 2007/064285 A1 | 6/2007 |
| WO | WO 2007/073266 A1 | 6/2007 |
| WO | WO 2007/110126 A1 | 10/2007 |

OTHER PUBLICATIONS

D. Zenisek, J. A. Steyer, W. Almers, *Transport, Capture and Exocytosis of Single Synaptic Vesicles at Active Zones*. Nature, vol. 406, 849-854 (Aug. 24, 2000) (6 pages).

Scot C. Kuo, *Using Optics to Measure Biological Forces and Mechanics*. Traffic 2(11), pp. 757-763 (2001) (7 pages).

Dmitriy M. Chudakov, Vladislav V. Verkhusha, Dmitry B. Staroverov, Ekaterina A. Souslova, Sergey Lukyanov, Konstantin A. Lukyanov, *Photoswitchable Cyan Fluorescent Protein for Protein Tracking*, Nature Biotechnology, vol. 22, No. 11, 1435-1439 (Nov. 2004) (5 pages).

Matthias Fricke, Tim Nielsen, *Two-Dimensional Imaging Without Scanning by Multifocal Multiphoton Microscopy*, Applied Optics, vol. 44, No. 15, 2984-2988 (May 20, 2005) (5 pages).

Konstantin A. Lukyanov, Dmitry M. Chudakov, Sergey Lukyanov, Vladislav V. Verkhusha, Innovation: *Photoactivatable Fluorescent Proteins*, Nature Reviews, Molecular Cell Biology, vol. 6, No. 11, 8858-91 (Nov. 2005) (7 pages).

Rebecca Medda, Stefan Jacobs, Stefan W. Hell, Jörg Bewersdorf: *4Pi Microscopy of Quantum Dot-Labeled Cellular Structures*, Journal of Structural Biology, 156, 517-523 (2006) (7 pages).

Prashant Prabhat, Sripad Ram, E. Sally Ward, Raimund J. Ober, *Simultaneous Imaging of Several Focal Planes in Fluorescence Microscopy for the Study of Cellular Dynamics in 3D*, Three-Dimensional and Multidimensional Microscopy: Image Acquisition and Processing XIII, Proc. of SPIE vol. 6090, 60900L (2006) (7 pages).

Katrin I. Willig, Silvio Rizzoli, Volker Westphal, Reinhard Jahn, Stefan W. Hell, *STED Microscopy Reveals That Synaptotagmin Remains Clustered After Synaptic Vesicle Exocytosis*. Nature, vol. 440, 935-939 (Apr. 13, 2006) (5 pages).

Jörg Bewersdorf, Brian T. Bennett and Kendall L. Knight: *H2AX Chromatin Structures and Their Response to DNA Damage Revealed by 4Pi Microscopy*; PNAS, vol. 103, No. 48, 18137-18142 (Nov. 28, 2006) (6 pages).

J. Fölling, V. Belov, R. Kunetsky, R. Medda, A. Schönle, A. Egner, C. Eggeling, M. Bossi, and S. W. Hell: *Photochromic Rhodamines Provide Naonscopy With Optical Sectioning*, Angew. Chem. Int. Ed. 6266-6270 (2007) (5 pages).

Prashant Prabhat, Zhuo Gan, Jerry Chao, Sripad Ram, Carlos Vaccaro, Steven Gibbons, Raimund J. Ober, E. Sally Ward, *Elucidation of Intracellular Recycling Pathways Leading to Exocytosis of the Fc Receptor, RcRn, by Using Multifocal Plane Microscopy*, PNAS, vol. 104, No. 14, 5889-5894 (Apr. 3, 2007) (7 pages).

Jeff Gelles, Bruce J. Schnapp, & Michael P. Sheetz, *Tracking Kinesin-Driven Movements With Nanometre-Scale Precision*, 331 Nature, 450-453 (Feb. 4, 1988) (4 pages).
Winfried Denk, James H. Strickler, & Watt. W. Webb, *Two-Photon Laser Scanning Fluorescence Microscopy*, 248 Science, 73-76 (Apr. 6, 1990) (2 pages).
S. Hell & E. H. K. Stelzer, *Fundamental Improvement of Resolution With a 4Pi-Confocal Fluorescence Microscope Using Two-Photon Excitation*, 93 Opt. Comm., 277-282 (1992) (6 pages).
Stefan Hell & Ernst H. K. Stelzer, *Properties of a 4Pi Confocal Fluorescence Microscope*, 9 Optical Society of America, 2159-2166 (Dec. 1992) (4 pages).
Stefan W. Hell & Jan Wichmann, *Breaking the Diffraction Resolution Limit by Stimulated Emission: Stimulated-Emission-Depletion Fluorescence Microscopy*, 19 Optics Letters, 780-782 (Jun. 1, 1994) (2 pages).
H. Pin Kao & A. S. Verkman, *Tracking of Single Fluorescent Particles in Three Dimensions: Use of Cylindrical Optics to Encode Particle Position*, 67 Biophysical Journal, 1291-1300 (Sep. 1994) (10 pages).
Mats G. L. Gustafsson, David A. Agard, & John W. Sedat, *Sevenfold Improvement of Axial Resolution in 3D Widefield Microscopy Using Two Objective Lenses*, 2412 SPIE, 147-156 (1995) (5 pages).
S.R. Hashemi-Nezhad & M. Dolleiser, *A Computer Controlled Optical Microscope for Three Dimensional Track Analysis*, 28 Radiation Measurements, 893-844 (1997) (3 pages).
M. G. L. Gustafsson, D.A. Agard, & J. W. Sedat, $I^5 M$: *3D Widefield Light Microscopy With Better Than 100 nm Axial Resolution*, 195 Journal of Microscopy, 10-16 (Jul. 1999) (7 pages).
Thomas A. Klar, Stefan Jakobs, Marcus Dyba, Alexander Egner, & Stefan W. Hell, *Fluorescence Microscopy With Diffraction Resolution Barrier Broken by Stimulated Emission*, 97 PNAS, 8206-8210 (Jul. 18, 2000) (3 pages).
Gregory S. Harms, Laurent Cognet, Piet H. M. Lommerse, Gerhard A. Blab, & Thomas Schmidt, *Autofluorescent Proteins in Single-Molecule Research: Applications to Live Cell Imaging Microscopy*, 80 Biophysical Journal, 2396-2408 (May 2001) (13 pages).
Eric O. Potma, Wim P. de Boeij, Leonard Bosgraaf, Jeroen Roelofs, Peter J. M. van Haastert, & Douwe A. Wiersma, *Reduced Protein Diffusion Rate by Cytoskeleton in Vegetative and Polarized Dictyostelium Cells*, 81 Biophysical Journal, 2010-2019 (Oct. 2001) (10 pages).
Alexander Egner, Stefan Jakobs, & Stefan W. Hell, *Fast 100-nm Resolution Three-Dimensional Microscope Reveals Structural Plasticity of Mitochondria in Live Yeast*, 99 PNAS, 3370-3375 (3 pages).
Russell E. Thompson, Daniel R. Larson, & Watt W. Webb, *Precise Nanometer Localization Analysis for Individual Fluorescent Probes*, 82 Biophysical Journal, 2775-2783 (May 2002) (9 pages).
George H. Patterson & Jennifer Lippincott-Schwartz, *A Photoactivatable GFP for Selective Photolabeling of Proteins and Cells*, 297 Science, 1873-1877 (Sep. 13, 2002) (5 pages).
Ahmet Yildiz, Joseph N. Forkey, Sean A. McKinney, Taekjip Ha, Yale E. Goldman, & Paul R. Selvin, *Myosin V Walks Hand-Over-Hand: Single Fluorophore Imaging With 1.5-nm Localization*, 300 Science, 2061-2065 (Jun. 27, 2003) (5 pages).
Alexander Egner, Sophie Verrier, Alexander Goroshkov, Hans-Dieter Söling, & Stefan W. Hell, *4Pi-Microscopy of the Golgi Apparatus in Live Mammalian Cells*, 147 Journal of Structural Biology, 70-76 (2004) (4 pages).
Ahmet Yildiz, Michio Tomishige, Ronald D. Vale, & Paul R. Selvin, *Kinesin Walks Hand-Over-Hand*, 303 Science, 676-678 (Jan. 30, 2004) (3 pages).
Kotono Murase, Takahiro Fujiwara, Yasuhiro Umemura,, Kenichi Suzuki, Ryota Iino, Hidetoshi Yamashita, Mihoko Saito, Hideji Murakoshi, Ken Ritchie, & Akihiro Kusumi, *Ultrafine Membrane Compartments for Molecular Diffusion as Revealed by Single Molecule Techniques*, 86 Biophysical Journal, 4075-4093 (Jun. 2004) (19 pages).
Udo Spöri, Antonio Virgilio Failla, & Christoph Cremer, *Super-resolution Size Determination in Fluorescence Microscopy: A Comparison Between Spatially Modulated Illumination and Confocal Laser Scanning Microscopy*, 95 Journal of Applied Physics, 8436-8443 (Jun. 15, 2004) (4 pages).

Hilmar Gugel, Jörg Bewersdorf, Stefan Jakobs, Johann Engelhardt, Rafael Storz, & Stefan W. Hell, *Cooperative 4Pi Excitation and Detection Yields Sevenfold Sharper Optical Sections in Live-Cell Microscopy*, 87 Biophysical Journal, 4146-4152 (Dec. 2004) (7 pages).
Mingming Wu, John W. Roberts, & Mark Buckley, *Three-Dimensional Fluorescent Particle Tracking at Micron-Scale Using a Single Camera*, 38 Experiments in Fluids, 461-465 (Feb. 26, 2005) (3 pages).
Ken Ritchie, Xiao-Yuan Shan, Junko Kondo, Kokoro Iwasawa, Takahiro Fujiwara, & Akihiro Kusumi, *Detection of Non-Brownian Diffusion in the Cell Membrane in Single Molecule Tracking*, 88 Biophysical Journal, 2266-2277 (Mar. 2005) (12 pages).
Alexander Egner & Stefan W. Hell, *Fluorescence Microscopy With Super-Resolved Optical Sections*, 15 Trends in Cell Biology, 207-215 (Apr. 2005) (5 pages).
Valeria Levi, QiaoQiao Ruan, & Enrico Gratton, *3-D Particle Tracking in a Two-Photon Microscope: Application to the Study of Molecular Dynamics in Cells*, 88 Biophysical Journal, 2919-2928 (Apr. 2005) (10 pages).
B. Sander, M.M. Golas, & H. Stark, *Advantages of CCD Detectors for de Novo Three-Dimensional Structure Determination in Single-Particle Electron Microscopy*, 151 Journal of Structural Biology, 92-105 (May 23, 2005) (7 pages).
Comert Kural, Hwajin Kim, Sheyum Syed, Gohta Goshima, Vladimir I. Gelfand, & Paul R. Selvin, *Kinesin and Dynein Move a Peroxisome in Vivo: A Tug-of-War or Coordinated Movement*, 308 Science, 1469-1472 (Jun. 3, 2005) (4 pages).
Marc Schneider, Sara Barozzi, Ilaria Testa, Mario Faretta, & Alberto Diaspro, *Two-Photon Activation and Excitation Properties of PA-GFP in the 720-920-nm Region*, 89 Biophysical Journal, 1346-1352 (Aug. 2005) (7 pages).
Valeria Levi, Anna S. Serpinskaya, Enrico Gratton, & Vladimir I. Gelfand, *Organelle Transport Along Microtubules in Xenopus Melanophores: Evidence for Cooperation Between Multiple Motors*, Biophys J BioFAST (Oct. 7, 2005) (27 pages).
Valeria Levi, Vladimir I. Gelfand, Anna S. Serpinskaya, & Enrico Gratton, *Melanosomes Transported by Myosin-V in Xenopus Melanophores Perform Slow 35 nm Steps*, Biophysical Journal: Biophysical Letters, L07-L09 (Oct. 27, 2005) (3 pages).
Valeria Levi, QiaoQiao Ruan, Matthew Plutz, Andrew S. Belmont, & Enrico Gratton, *Chromatin Dynamics in Interphase Cells Revealed by Tracking in a Two-Photon Excitation Microscope*, 89 Biophysical Journal, 4275-4285 (Dec. 2005) (11 pages).
Michael Hofmann, Christian Eggeling, Stefan Jakobs, & Stefan W. Hell, *Breaking the Diffraction Barrier in Fluorescence Microscopy at Low Light Intensities by Using Reversibly Photoswitchable Proteins*, 102 PNAS, 17565-17569 (Dec. 6, 2005) (3 pages).
Prashant Prabhat, Sripad Ram, E. Sally Ward, & Raimund J. Ober, *Simultaneous Imaging of Several Focal Planes in Fluorescence Microscopy for the Study of Cellular Dynamics in 3D*, 6090 Proc. of SPIE, (2006) (7 pages).
Valeria Levi, Anna S. Serpinskaya, Enrico Gratton, & Vladimir I. Gelfand, *Organelle Transport Along Microtubules in Xenopus Melanophores: Evidence for Cooperation Between Multiple Motors*, 90 Biophysical Journal, 318-327 (Jan. 2006) (10 pages).
Erdal Toprak, Joerg Enderlein, Sheyum Syed, Sean A. McKinney, Rolfe G. Petschek, Taekjip Ha, Yale E. Goldman, & Paul R. Selvin, *Defocused Orientation and Position Imaging (DOPI) of Myosin V*, 103 PNAS, (Apr. 25, 2006) (6 pages).
J. Bewersdorf, R. Schmidt, & S. W. Hell, *Comparison of $I^5 M$ and 4Pi-Microscopy*, 222 Journal of Microscopy, 105-117 (May 2006) (10 pages).
Robert J. Kittel, Carolin Wichmann, Tobias M. Rasse, Wernher Fouquet, Manuela Schmidt, Andreas Schmidt, Dhananjay A. Wagh, Christian Pawlu, Robert R. Kellner, Katrin I. Willig, Stefan W. Hell, Erich Buchner, Manfred Heckmann, & Stephan J. Sigrist, *Bruchpilot Promotes Active Zone Assembly, $Ca^{2+}$ Channel Clustering, and Vesicle Release*, 312 Science, 1051-1054 (May 19, 2006) (2 pages).
Michael J. Rust, Mark Bates, & Xiaowei Zhuang, *Sub-Diffraction-Limit Imaging by Stochastic Optical Reconstruction Microscopy (STORM)*, Nature Methods / Advance Online Publication (Aug. 9, 2006) (3 pages).

Jörg Enderlein, Erdal Toprak, & Paul R. Selvin, *Polarization Effect on Position Accuracy of Fluorophore Localization*, 14 Optics Express, 8111-8120 (Sep. 4, 2006) (10 pages).

Rebecca Medda, Stefan Jakobs, Stefan W. Hell, & Jörg Bewersdorf, *4Pi Microscopy of Quantum Dot-Labeled Cellular Structures*, 156 Journal of Structural Biology, 517-523 (Sep. 7, 2006) (4 pages).

Eric Betzig, George H. Patterson, Rachid Sougrat, O. Wolf Lindwasser, Scott Olenych, Juan S. Bonifacino, Michael W. Davidson, Jennifer Lippincott-Schwartz, & Harald F. Hess, *Imaging Intracellular Fluorescent Proteins at Nanometer Resolution*, 313 Science, 1642-1645 (Sep. 15, 2006) (4 pages).

Ivan Rasnik, Sean A. McKinney, & Taekjip Ha, *Nonblinking and Long-Lasting Single-Molecule Fluorescence Imaging*, Nature Methods / Advance Online Publication (Oct. 1, 2006) (3 pages).

Jörg Bewersdorf, Brian T. Bennett, & Kendall L. Knight, *H2AX Chromatin Structures and Their Response to DNA Damage Revealed by 4Pi Microscopy*, 103 PNAS, 18137-18142 (Nov. 28, 2006) (3 pages).

Samuel T. Hess, Thanu P. K. Girirajan, & Michael D. Mason, *Ultra-High Resolution Imaging by Fluorescence Photoactivation Localization Microscopy*, 91 Biophysical Journal, 4258-4272 (Dec. 2006) (15 pages).

A. V. Moskalenko, D. J. Burbridge, G. Viau, & S. N. Gordeev, *Electron-Beam-Induced Welding of 3D Nano-Objects From Beneath*, 18 Nanotechnology 1-6 (2007) (3 pages).

Gerald Donnert, Jan Keller, Christian A. Wurm, Silvio O. Rizzoli, Volker Westphal, Andreas Schönle, Reinhard Jahn, Stefan Jakobs, Christian Eggeling, & Stefan W. Hell, *Two-Color Far-Field Fluorescence Nanoscopy*, Biophysical Journal, L67-L69 (Feb. 6, 2007) (2 pages).

Prashant Prabhat, Zhuo Gan, Jerry Chao, Sripad Ram, Carlos Vaccaro, Steven Gibbons, Raimund J. Ober, & E. Sally Ward, *Elucidation of Intracellular Recycling Pathways Leading to Exocytosis of the Fc Receptor, FcRn, by Using Multifocal Plane Microscopy*, PNAS (Mar. 23, 2007) (7 pages).

Stefan W. Hell, *Far-Field Optical Nanoscopy*, 316 Science, 1153-1158 (May 25, 2007) (3 pages).

C. Geisler, A. Schönle, C. von Middendorff, H. Bock, C. Eggeling, A. Egner, & S.W. Hell, *Resolution of $\lambda/10$ in Fluorescence Microscopy Using Fast Single Molecule Photo-Switching*, 88 Applied Physics A, 223-226 (Jun. 1, 2007) (4 pages).

Erdal Toprak, Hamza Balci, Benjamin H. Blehm, & Paul R. Selvin, *Three-Dimensional Particle Tracking via Bifocal Imaging*, 7 Nano Letters, 2043-2045 (Jun. 6, 2007) (3 pages).

H. Bock, C. Geisler, C.A. Wurm, C. Von Middendorff, S. Jakobs, A Schönle, A. Egner, S.W. Hell, & C. Eggeling, *Two-Color Far-Field Fluorescence Nanoscopy Based on Photoswitchable Emitters*, 88 Applied Physics B, 161-165 (Jul. 6, 2007) (5 pages).

J. Fölling, V. Belov, R. Kunetsky, R. Medda, A. Schönle, A. Egner, C. Eggerling, M. Bossi, & S.W. Hell, *Photochromic Rhodamines Provide Nanoscopy With Optical Sectioning*, Angewandte Chemie (Jul. 19, 2007) (7 pages).

Mark Bates, Bo Huang, Graham T. Dempsey, & Xiaowei Zhuang, *Multicolor Super-Resolution Imaging With Photo-Switchable Fluorescent Probes*, 317 Science, 1749-1753 (Sep. 21, 2007) (6 pages).

Samuel T. Hess, Travis J. Gould, Manasa V. Gudheti, Sarah A. Maas, Kevin D. Mills, & Joshua Zimmerberg, *Dynamic Clustered Distribution of Hemagglutinin Resolved at 40 nm in Living Cell Membranes Discriminates Between Raft Theories*, 104 PNAS, 17370-17375 (Oct. 30, 2007) (6 pages).

Alexander Egner, Claudia Geisler, Claas von Middendorff, Hannes Bock, Dirk Wenzel, Rebecca Medda, Martin Andresen, Andre C. Stiel, Stefan Jakobs, Christian Eggeling, Andreas Schönle, & Stefan W. Hell, *Fluorescence Nanoscopy in Whole Cells by Asynchronous Localization of Photoswitching Emitters*, 93 Biophysical Journal, 3285-3290 (Nov. 2007) (6 pages).

Machine Translation of European Patent 0 491 289 B1 (5 pages).

\* cited by examiner

MICROSCOPIC IMAGING TECHNIQUES

RELATED APPLICATIONS

This application is related to and claims priority to U.S. Provisional Patent Application Ser. No. 60/879,833 filed Jan. 11, 2007, titled "Microscopic Imaging Techniques," which is incorporated herein in its entirety.

FIELD OF THE INVENTION

The present invention relates generally to microscopic imaging and, more specifically, to three-dimensional ("3D") photoactivation localization microscope imaging.

BACKGROUND OF THE INVENTION

A conventional light microscope provides a resolution on the order of about 250 nanometers in a lateral two-dimensional ("2D") plane (i.e., x-y plane) and on the order of about 600 nanometers, or worse, in an axial direction (i.e., z axis). To obtain higher resolution images, other microscopy methods must be utilized.

4Pi-Microscopy

A number of techniques have been able to provide a higher resolution in the axial direction to achieve an improved 3D image of structures. For example, 4Pi confocal microscopy and $I^5M$ microscopy can provide a resolution on the order of about 250 nanometers in the lateral plane (same as conventional microscopy) and on the order of about 100 nanometers in the axial direction (approximately 6-fold higher resolution in the axial direction than conventional microscopy).

4Pi-microscopy is a fluorescence far-field technique that enhances the diffraction-limited optical resolution of confocal laser scanning microscopy in the axial direction by utilizing two opposing objectives. For example, 4Pi-microscopy is described in an article titled "Fundamental improvement of resolution with a 4Pi-confocal fluorescence microscope using two-photon exciation" by S. Hell and E. H. K. Stelzer (1992, Opt. Comm. 93: 277-282), which is incorporated herein by reference in its entirety. A coherent superposition of two counter-propagating wavefronts at a common focus point modulates an axially elongated focus of a single objective resulting in a sharp central maximum and two axially shifted side-maxima. By applying 2-photon excitation ("2PE"), the side-maxima height can be lowered and the artifacts produced by the side-maxima can be removed by post-processing, resulting in 3D imaging with an axial resolution of 100 to 150 nanometers. A more detailed description of the 2PE is described in an article titled "Two-photon laser scanning fluorescence microscopy," by W. Denk, J. H. Strickler, and W. W. Webb (1990, Science 248, 73-76), which is incorporated herein by reference in its entirety.

$I^5M$ is a "wide-field version" of 4Pi that can utilize a spatially incoherent light source, e.g., a mercury lamp, and a CCD camera instead of a confocal scanner in the same kind of interference geometry. While the high I5M side-maxima are often difficult to remove, localization measurements of single particles can be performed more quickly. For example, $I^5M$ microscopy is described in an article titled "$I^5M$: 3D widefield light microscopy with better than 100 nm axial resolution" by M. G. L. Gustafsson, D. A. Agard, and J. W. Sedat (1999, J. Microsc. 195: 10-16), which is incorporated herein by reference in its entirety.

A "Type C" mode of 4Pi microscopy, which increases 4Pi-resolution by 30% down to about 100 nanometers, is also the base for implementation of $I^5M$ into current 4Pi microscopes. A more detailed description of this 4Pi microscopy is described in an article titled "Cooperative 4Pi excitation and detection yields 7-fold sharper optical sections in live cell microscopy" by H. Gugel, J. Bewersdorf, S. Jakobs, J. Engelhardt, R. Storz, and S. W. Hell (2004, Biophys. J. 87, 4146-4152), which is incorporated herein by reference in its entirety. 4Pi Type C imaging recently identified histone H2AX structures, with improvements in imaging resolution that enabled the definition of boundaries of γ-H2AX spreading based on their size and distribution. A more detailed description of these improvements is included in an article titled "Novel H2AX Chromatin Structures Revealed by 4Pi Microscopy," by J. Bewersdorf, B. T. Bennett, and K. L. Knight (2006, Proc. Nat. Acad. Sci., doi:10.1073/pnas.0608709103), which is incorporated herein by reference in its entirety.

Fluorescence Photoactivation Microscopy (FPALM)

A further improvement in the lateral resolution has been achieved by utilizing Fluorescence Photo Activation Localization Microscopy ("FPALM"). Specifically, FPALM imaging techniques can be utilized to facilitate visualization of multiple structures down to about a demonstrated 30 nanometer length scale (and smaller in principle) in the cell nucleus. Thus, FPALM provides nearly a one order of magnitude higher resolution in the lateral plane than conventional, 4Pi, or $I^5M$ microscopy. However, a problem with current FPALM imaging techniques is that it does not provide improved 3D resolution in the axial direction. Although FPALM can provide a 3D image of a particle by combining images of multiple 2D planes of a sample, this type of image has only a very poor resolution in the axial direction comparable to conventional microscopy because it fails to provide any axial resolution within any of the combined images. In other words, FPALM can only image a structure that can be observed in a particular slice of a sample, i.e., within a particular 2D plane of the sample, with improved resolution. FPALM cannot identify any fine structure along the axial direction of the particular slice.

Thus, FPALM has not yet been extended to 3D imaging. This is due to the currently used standard widefield or total internal reflection (TIR) microscopy geometries not being suitable to 3D FPALM imaging.

FPALM measures the positions (by localization) of large numbers (e.g., $10^4$ to $10^6$) of single fluorescent molecules to generate images with nanometer resolution (demonstrated resolution 20-30 nanometers). FPALM is predicated on single molecule detection methods that allow position localization of spatially isolated fluorophores with much higher precision than the theoretical resolution limit of a light microscope.

The key to high resolution FPALM is the activation of only a sparse subset of available fluorescent probes at any one time, such that nearly all fluorophores are spatially separated by at least the optical resolution of the system and can be localized individually. The molecules are generally localized using single molecule detection methods. Fluorescent probes, such as photoactivatable green fluorescent protein ("PA-GFP"), are initially in a non-fluorescent or weakly fluorescent state. A more detailed description of some fluorescent probes is provided in an article titled "A photoactiavatable GFP for selective photolabeling of proteins and cells," by G. H. Patterson and J. Lippincott-Schwarz (2002, Science 297, 1873-1877), which is incorporated herein by reference in its entirety. Wide-field irradiation with a short wavelength (~405 nanometers) source activates a stochastic, sparse subset of the fluorophores (irreversibly in the case of PA-GFP) in the field of view. The activated molecules are then excited as for normal single molecule fluorescence using a longer wavelength (~480 to 500 nanometers) source, and then imaged with a sensitive CCD camera until photobleached. Photobleaching may be actively induced, or may occur spontaneously after a certain number of fluorophore excitation-emission cycles. This process is repeated until the entire probe population is exhausted, or until sufficient information about the sample has been obtained. The positions of observed and localized molecules are then plotted to construct a 2D map.

The resolution in FPALM is referred to as a localization-based resolution, in contrast to the diffraction-limited optical resolution of conventional microscopes. While the localization-based resolution is approximately proportional to the optical resolution of the microscope, it can exceed the optical resolution by a large factor (e.g., more than a factor of 10) if a sufficient number of photons is collected per fluorescent molecule. A more detailed description of the localization-based resolution is provided in an article titled "Precise Nanometer Localization Analysis for Individual Fluorescent Probes," by R. E. Thompson, D. R. Larson, and W. W. Webb (2002, Biophys. J. 82: 2775-2783), which is incorporated herein by reference in its entirety.

Thus, there is a need for improved ultra high 3D resolution in fluorescence microscopy. None of the current fluorescence microscopy techniques can enhance resolutions of light microscopy to levels of electron microscopy. A need exists for a fluorescence microscopy technique that can resolve particles in 3D with a resolution higher than the current resolution of 100 nanometers in 4Pi fluorescence microscopy. The present invention is directed to satisfying one or more of these needs and solving other problems.

SUMMARY OF THE INVENTION

According to one embodiment, a method of performing 3D photoactivation microscope imaging includes providing a sample having a plurality of probes, each of the plurality of probes including a photo-activatable material. Probes from the plurality of probes are activated to form a sparse subset of probes, the sparse subset of probes having probes that are spatially separated by at least a microscope resolution. The sample is illuminated with a readout light source, and light emitted from activated probes is detected. Based on the light emission detected from the activated probes, localized three-dimensional positions of the activated probes are obtained.

According to another embodiment, a photoactivation microscope system is configured to generate 3D images of a sample. The microscope system includes an activation light source, a readout light source, a spatially resolving detector, and a controller. The activation light source is configured to activate probes of at least one probe subset, the probes being selected from a plurality of photo-activatable probes within a sample. The readout light source is configured to illuminate the sample with a readout light. The spatially resolving detector is configured to detect light emission from activated probes. The controller is configured to construct a 3D image of the sample in accordance with localized three-dimensional positions of the activated probes. The localized three-dimensional positions are based on the detected light emission from the activated probes.

According to yet another embodiment, a method of performing 3D photoactivation microscope imaging includes providing a sample having a plurality of probes, each of the plurality of probes including a photo-activatable material. A first subset of probes, from the plurality of probes, is activated, and the sample is illuminated with a readout light source. Light emitted by the activated probes of the first subset of probes is detected. A localized three-dimensional position is obtained for at least one of the activated probes of the first subset of probes to form a first detected image. The activated probes of the first subset of probes are deactivated and a second subset of probes, from the plurality of probes, is activated. Light emitted by the activated probes of the second subset of probes is detected. A localized three-dimensional position is obtained for at least one of the activated probes of the second subset of probes to form a second detected image. A 3D image is constructed based on the first detected image and the second detected image.

Additional aspects of the invention will be apparent to those of ordinary skill in the art in view of the detailed description of various embodiments, which is made with reference to the drawings, a brief description of which is provided below.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

According to one embodiment, Three-Dimensional Fluorescence Photo Activation Localization Microscopy ("3D FPALM") methods provide a localization-based resolution of at least 30 nanometers in three-dimensions ("3D") that may be achieved on a single molecule level. In fact, the 3D FPALM methods can resolve particles on the order of about 20-30 nanometers in the lateral plane (more than 10 times greater than conventional, 4Pi, and I$^5$M microscopy) and on the order of about 10 nanometers in the axial direction (about 60 times greater than conventional microscopy and about 10 times greater than 4Pi and I$^5$M microscopy). The axial resolution of 3D FPALM is something that has simply not been achieved by previous FPALM methods, which are unable to resolve particles in the axial direction, or any other light microscopy technique.

It has been found that 2-photon excitation ("2PE") can activate photoactivatable ("PA") green fluorescent protein ("GFP") in a single focal plane that has a thickness of only a few hundred nanometers. Accordingly, combining features of 2PE, 4Pi, $I^5M$, and FPALM into a single instrument can facilitate the imaging of nuclear structures, such as GFP-tagged histones, with unprecedented resolution.

According to an alternative embodiment, a photoactivation process that depends non-linearly on the light source intensity can be used to activate probes (e.g., PA fluorescent molecules) within a sample. A sparse subset of the probes is activated within a volume constrained within a depth of the sample, wherein the probes are predominantly spatially separated by at least a lateral resolution of the microscope, e.g., 250 nanometers.

The sample is illuminated with a readout light source and light emission from the activated probes is detected. The activated probes are deactivated and localized positions of the activated probes, for which light emission was detected, are obtained (e.g., calculated) based on the detected light emission. The activation, readout, and detection steps can be performed for different volumes constrained within different depths of the sample, wherein the different volumes include different sparse subsets of probes. A 3D image of the sample is constructed based on the obtained localized positions of the probes from different volumes constrained within different depths of the sample.

For example, according to one embodiment at least one of an illumination light pattern and a detection efficiency pattern is modulated in an axial direction. At least two different axial patterns are applied for the sparse subset of probes, and images are collected via a detector for each applied pattern. Based on the collected images, probes of the sparse subset of probes are located in three-dimensions.

In alternative embodiments, an $I^5M$ setup can be used with FPALM to enable a readout technique that can provide a localization-based axial resolution equivalent or even superior to the lateral direction. For example, a Leica TCS 4PI microscope featuring 2PE, 4Pi, and $I^5M$ imaging modes is an ideal base for realizing 3D FPALM.

Figure 1:
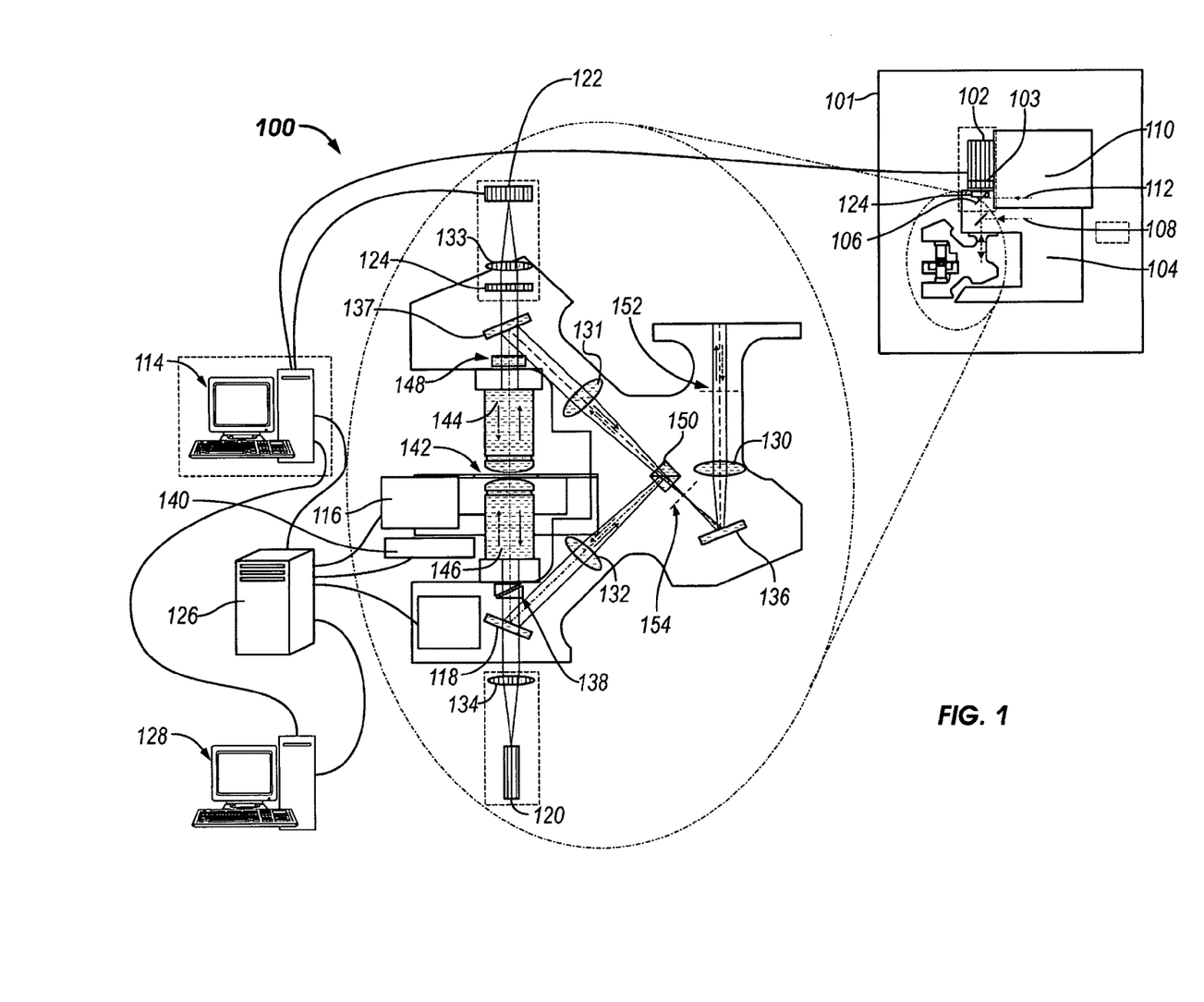
FIG. 1 is a schematic view illustrating a 3D FPALM microscope setup, according to one embodiment.

Referring to FIG. 1, an exemplary 3D FPALM microscopy system 100 is based on a conventional 4Pi microscope 101, which is upgraded to 3D FPALM imaging without interfering with its standard 4Pi microscopy performance. In general, some components that were added to the 4Pi microscope 101 are shown surrounded by a dashed line. However, although this example refers to the 4Pi microscope 101, it should be appreciated that the techniques presented herein may be implemented in any other suitable manner. The 3D FPALM microscopy system 100 includes a sensitive (e.g., electron-multiplying) CCD ("EM-CCD") camera 102 at a camera port 103 of a microscope stand 104, an infrared ("IR") beam splitter 106, an argon-ion laser 108 (the readout laser), and a confocal laser scanner 110.

The CCD camera 102 is used as a spatially resolving detector and is configured to detect light emission from activated probes of a sample (e.g., sample 142). The activated probes are generally selected from a plurality of photo-activatable probes, such as fluorescent molecules. The argon-ion laser 108 is a laser source that is used as a readout light source and is configured to excite probes for emission from the sample 142.

To use the camera port 103 for imaging and the laser scanner 110 for 2PE activation from a 2PE activation laser source (e.g., a pulsed Ti:sapphire laser) 112, without moving parts mechanically in between, the IR beam splitter 106 is inserted into the camera transmission path. A computer 114 with Leica-compatible software code is added to read out the EM-CCD camera 102, to coordinate with other microscope components including a z-stage 116 and laser shutters, and to control the interference phase by moving a piezo-mounted mirror 118. Accordingly, the computer 114 is communicatively coupled to the EM-CCD camera 102 and to a position sensitive detector 122.

A feedback control including a laser diode 120 and the position sensitive detector 122 that detects the laser light transmitted through two objectives (i.e., a first objective 146 and a second objective 144) can be included to compensate for drift with increased acquisition times. The argon-ion laser 108 (e.g., operating at 488, 477, or 496 nanometers) can be coupled into an Hg-lamp port for readout of the switched-on PA-GFP. One or more filters 124 can be added to the microscope at different locations to filter out laser light. Optionally, the interference phase can be shifted by moving the piezo mirror 118 over several periods to filter out other signal-influencing effects, such as blinking and bleaching.

The 3D FPALM microscopy system 100 can further include other components, such as a 4Pi control box 126, a Leica TCS 4Pi computer 128, a plurality of lenses 130-134 (including conventional first lens 130, second lens 131, and third lens 132), a first mirror 136, a second mirror 137, a plurality of glass wedges 138, a piezo objective stage 140, the first objective 144, the second objective 146, a glass window 148, and a beam splitter 150. Other components can include shutters and optics for coupling the laser 108. The 4Pi control box 126 is communicatively coupled to the computer 114, the Leica TCS 4Pi computer 128, the piezo z-stage 116, and the piezo mirror 118. The 4Pi control box 126 controls the moving of a sample on the piezo z-stage 116. In addition to the 4Pi control box 126, the Leica TCS 4Pi computer 128 is communicatively coupled to the computer 114. One or more of the computer 114 and the Leica TCS 4Pi computer 128 can be configured (e.g., programmed) to construct a 3D image of the sample 142 based on detected light emission from the activated probes.

An exit pupil 152 of the confocal microscope is shown in the 4Pi module above the first lens 130. An intermediate image plane 154 is shown between the first mirror 136 and the beam splitter 150. The sample 142 is shown on the z-stage 116, between the first objective 144 and the second objective 146. The z-stage 116 remains stationary during detection of probes from a sparse subset of probes.

The 3D FPALM microscopy system 100 is operated to perform volumetric imaging (e.g., 3D imaging). PA-GFP molecules in a lateral optical section of the 3D volume can be switched on by scanning the field with the 2PE activation 112 in 4Pi mode in this plane. The fluorescence signal can be read out in $I^5M$ mode (analogous to the widefield mode of regular FPALM) by illuminating the sample 142 with the beam of the argon-ion laser 108 (made spatially incoherent) in Koehler mode and detecting the light with the EM-CCD camera 102. The lateral position of the molecules can be determined analogously to conventional FPALM.

To obtain the axial position of the molecules, images at different $I^5M$ interference phases are recorded. To avoid axial localization artifacts due to blinking and bleaching of the molecules, approximately 5 runs of the phase scan (which are not scans of the z-stage 116) can be performed, resulting in 10 to 100 images per activation cycle. For lateral localization, these images can be added up, while for axial localization the interference modulation function can be fitted to the profiles. The axial localization accuracies are about 10 nanometers, based on the higher axial resolution of $I^5M$ compared to the lateral detection of point-spread functions ("PSF") profiles.

The axial position of the molecules can be obtained at least in part by measuring a phase shift of interference phase modulation. Analogous to lock-in amplifiers in electronics, the periodic modulation of the signal by varying the interference phase additionally allows differentiating between diffuse background and localized signal. Molecules outside the 2PE plane are not activated and will not be bleached by the readout light. The activation-recording cycle can be repeated analogous to conventional FPALM (but in planes at different axial positions in the sample 142) after most of the molecules have been bleached. Combining the information of these cycles can result in the construction of a final 3D position map of PA-GFP molecules.

Thus, the disclosed methods of 3D FPALM, such as the exemplary 4Pi FPALM setup, can provide 3D images with at least 30 nanometers resolution in all directions of PA-GFP labeled nuclear structures (e.g., histones). A second color that labels, for example, a certain small gene domain with quantum dots can be imaged conventionally and allows its localization relative to the highly resolved chromatin structure.

Optionally, if background fluorescence is not too strong, imaging can be performed with whole cells. Alternatively, cells can be cut in sections having a thickness of about 1 micrometer. Background fluorescence can be suppressed by pre-bleaching the sample 142 before photoactivation. The signal can also be filtered out from diffuse background by its phase-variation dependency.

Imaging of a chromosome territory ("CT") having a thickness of about 1 micrometer may take approximately 1 to 2 hours (assuming 10 activation cycles/second). Drift, which may occur during acquisition times, can be counteracted by a feedback control that locks the relative objective positions. The feedback control, for example, is controlled by the computer 114 and includes the laser diode 120, two lenses 133-134, one filter 124, and the position sensitive detector 122. Sample and phase drift can be corrected by imaging non-bleaching (fiduciary) reference structures at defined time intervals and recording their positions. Ambiguity in the axial position due to activation of molecules by the side maxima of the 2PE 4Pi-PSF can be countered by carefully analyzing the variation of the signal fluctuations with the phase variation. Molecules that cannot be localized with sufficiently high certainty can be analyzed separately or excluded from the final combined position map. This does not change the overall recorded structure since this process is position independent.

Figure 2:
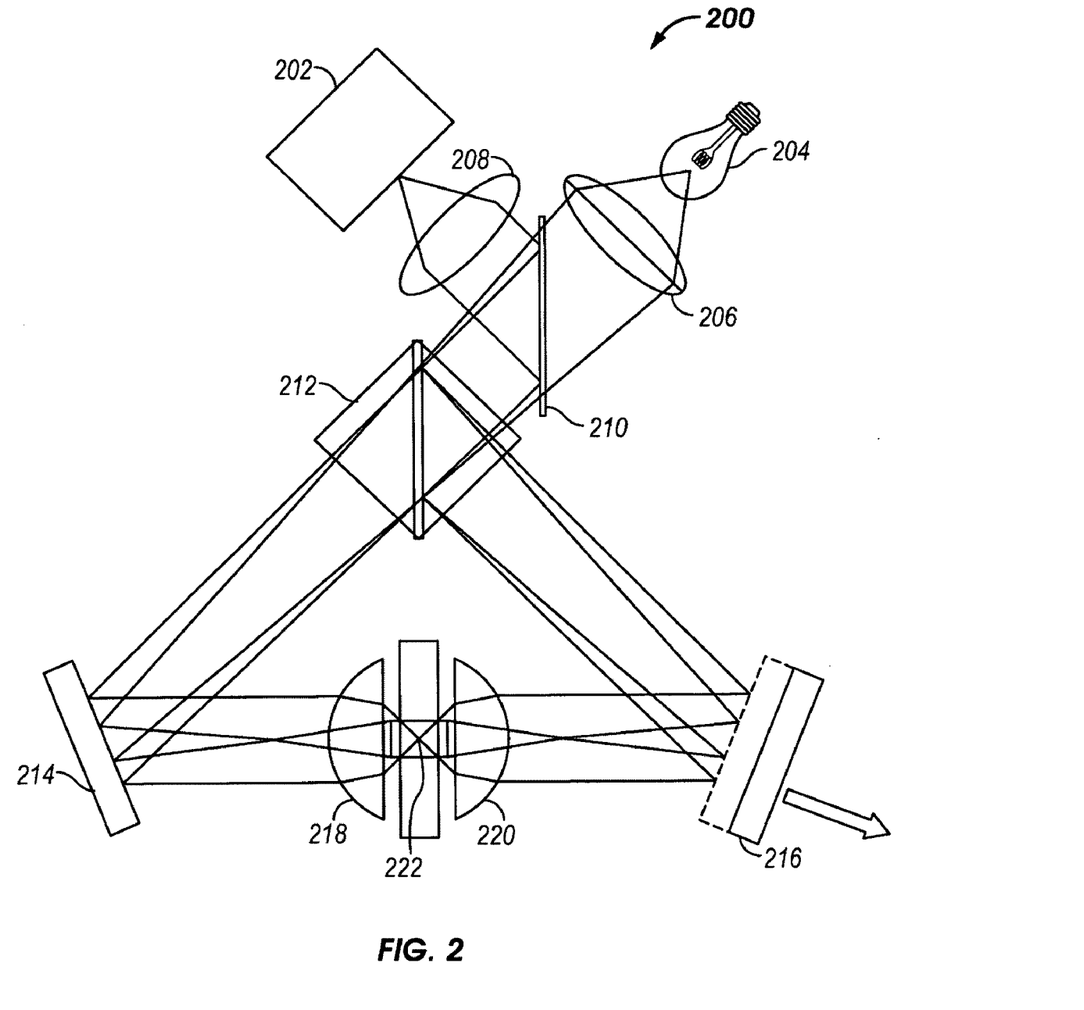
FIG. 2 is a schematic view illustrating movement of piezo mirror in a 3D FPALM microscope setup, according to an alternative embodiment.

Referring to FIG. 2, a 3D FPALM microscopy system 200 includes a CCD camera 202, a lamp 204 a first lens 206, a second lens 208, a beam splitter 210, a beam splitter cube 212, a mirror 214, a piezo mirror 216, a first objective lens 218, a second objective lens 220, and a sample 222. The first objective lens 218 and the second objective lens 220 help to illuminate the sample 222 (to establish the coherent superposition of the two counter-propagating light wavefronts) and to collect the light emission from activated probes.

In general, the only moving component during a phase scan is the piezo mirror 216, which moves from a first position (shown in dashed lines) to a second position (shown in solid lines). The sample 222 (and corresponding stage) does not move during the phase scan. As described in more detail below, the movement of the piezo mirror 216 results in a variance in the detected fluorescence signal for a number of particles. Based on the variance in the detected fluorescence signal, the particles are imaged in 3D. More specifically, the movement of the piezo mirror 216 shifts the interference pattern in the sample created by coherent superposition of two counter-propagating light wavefronts via the two opposing objective lenses, the first objective lens 218 and the second objective lens 220.

Figure 3A:
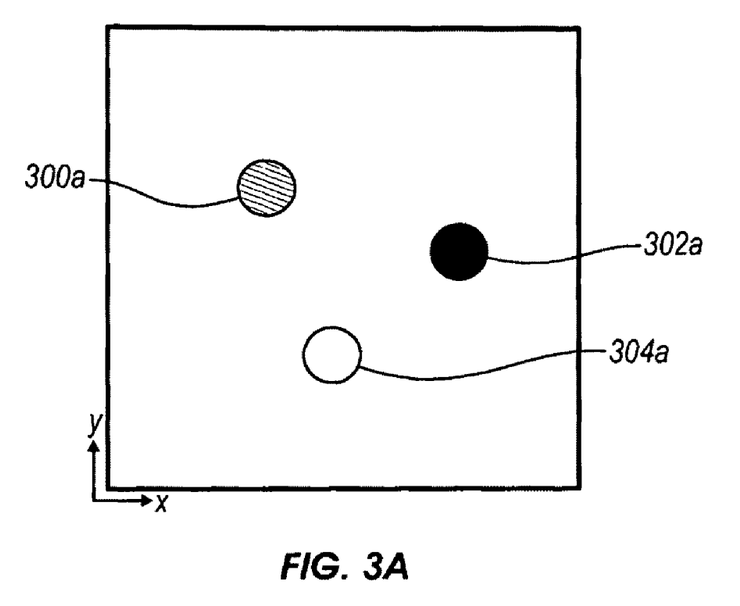
FIG. 3A is an illustration of the intensity of a number of particles detected in a CCD image before moving the piezo mirror illustrated in FIG. 2, according to an alternative embodiment.
Figure 3B:
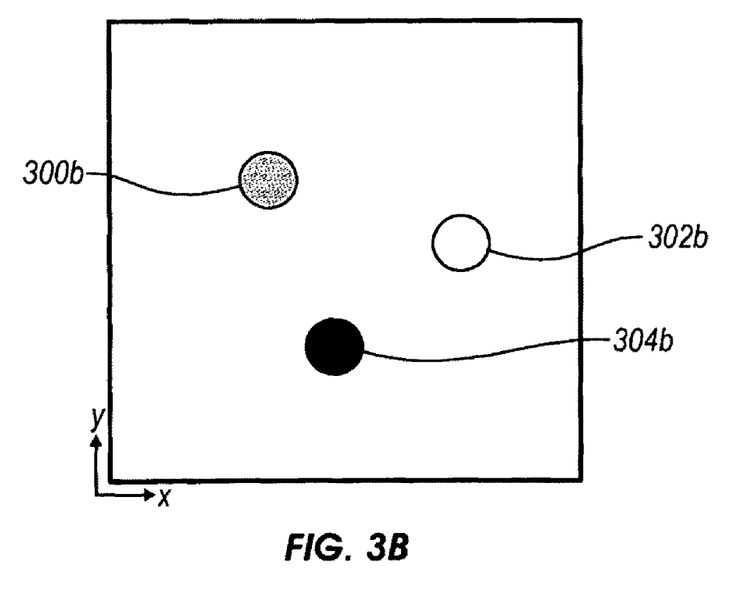
FIG. 3B is an illustration of the intensity of the particles after moving the piezo mirror illustrated in FIG. 2, according to an alternative embodiment.

Referring to FIGS. 3A-3B, a top view of a sample illustrates three particles in a lateral plane (i.e., x-y plane). The three particles have fluorescent intensities in accordance with the position of the piezo mirror 216. The three particles include a top particle, a middle particle, and a bottom particle. In the first position of the piezo mirror 216, the particles are illustrated having a corresponding first intensity 300a, 302a, and 304b. For example, the top particle has an intermediate intensity 300a, the middle particle has a high intensity 302a, and the bottom particle has a low intensity 304a. When the piezo mirror 216 is moved to the second position, the intensity of the three particles changes. The intensity of the top particle changes slightly to a somewhat less intense intensity 300b, the middle particle changes to a low intensity 302b, and the bottom particle changes to a high intensity 304b.

Figure 4A:
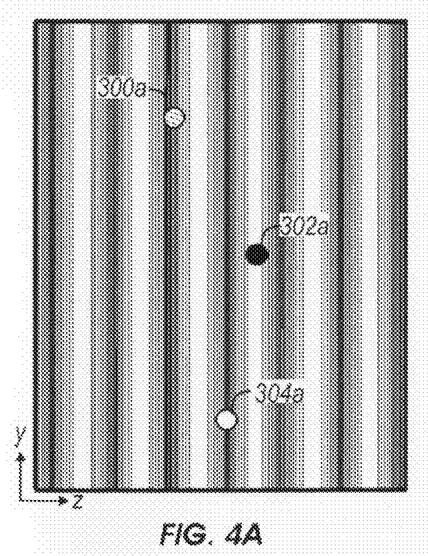
FIG. 4A is an illustration of a close-up of the particles of FIG. 3A overlapping an interference pattern before moving the piezo mirror illustrated in FIG. 2, according to an alternative embodiment.
Figure 4B:
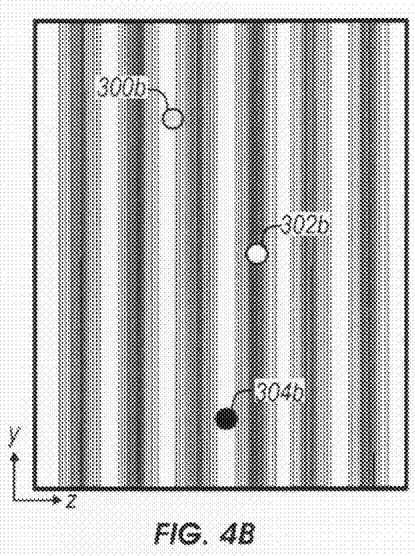
FIG. 4B is an illustration of a close-up of the particles of FIG. 4A after the interference pattern has shifted in accordance with movement of the piezo mirror illustrated in FIG. 2, according to an alternative embodiment.

Referring to FIGS. 4A-4B, a side view of the three particles of FIGS. 3A-3B illustrates the particles in an axial plane (i.e., z-y plane) overlaid on an interference pattern that indicates their respective axial position in the first position and second position of the piezo mirror 216. For reference purposes, objectives are located to the left and to the right of the sample as viewed on the page. The interference pattern includes a plurality of peaks and valleys, the valleys indicating the least intensive fluorescence of a particle and the peaks indicating the most intensive fluorescence of the particle. More specifically, the interference pattern is shifted in FIG. 4B with respect to the interference pattern illustrated in FIG. 4A.

As shown, in the first position of the piezo mirror 216 (FIG. 4A) the top particle is located between a peak and a valley, and, thus, it is fluorescing with intermediate intensity 300a. In the second position of the piezo mirror 216 (FIG. 4B), the top particle is shown between a valley and a peak, and, thus, it has a somewhat similar intermediate intensity 300b (i.e., not much of a change in intensity between the two positions of the piezo mirror 216).

The middle particle is shown near a peak in the first position of the piezo mirror 216 (FIG. 4A) and near a valley in the second position of the piezo mirror 216 (FIG. 4B). Thus, the intensity of the middle particle changes from the high intensity 302a to the low intensity 302b. The bottom particle is shown near a valley in the first position of the piezo mirror 216 (FIG. 4A) and near a peak in the second position of the piezo mirror 216 (FIG. 4B). Thus, the intensity of the bottom particle changes from the low intensity 304a to the high intensity 304b.

Figure 5:
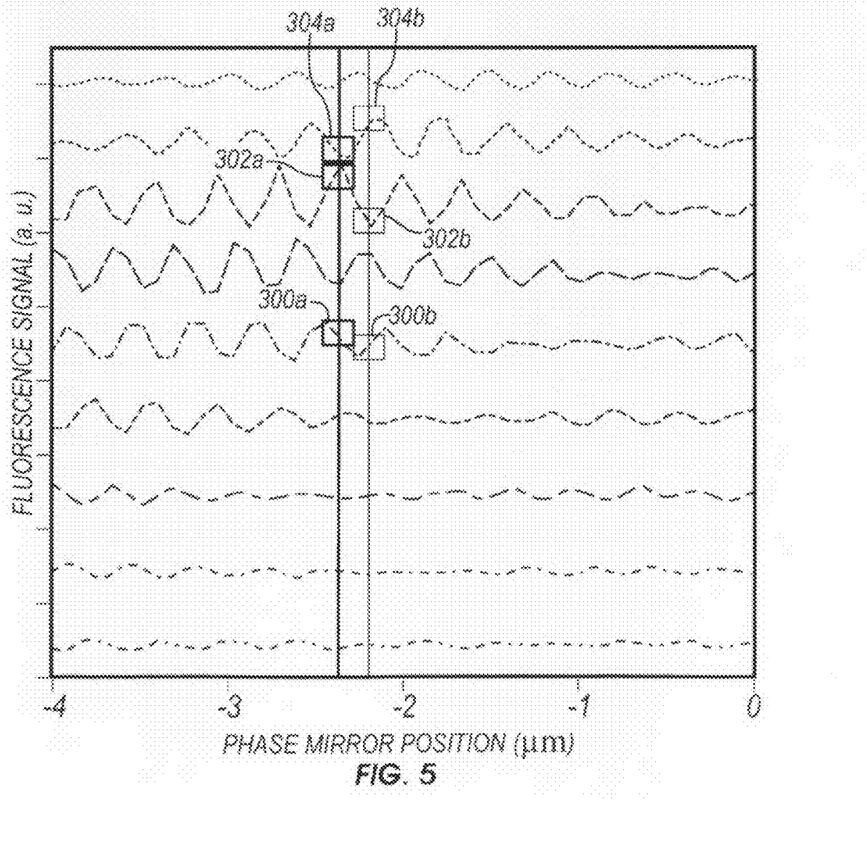
FIG. 5 is a chart illustrating the fluorescence signal of a number of particles based on the phase mirror position, according to an alternative embodiment.

Referring to FIG. 5, a chart illustrates the fluorescence signal from a plurality of particles (vertical axis) based on the phase position of the piezo mirror 216 (horizontal axis). The chart includes a plot of the fluorescence signal for each of the three particles described above in reference to FIGS. 3A-4B.

For example, the fluorescence signal for the top particle is a line on which intensity points 300a, 300b are located. Consistent with the description provided above, the top particle has a generally intermediate intensity 300a in the first position of the piezo mirror 216 and a somewhat similar intensity 300b in the second position of the piezo mirror 216. As shown, in the first position the intermediate intensity 300a is on a right side of a peak, between the adjacent peak and the adjacent valley of the respective fluorescence signal. In the second position, the intermediate intensity 300b is on a left side of a peak, between the adjacent valley and the adjacent peak of the respective fluorescence signal.

Also consistent with the description provided above are the chart illustrations of the middle particle and the bottom particle. As shown, the middle particle is shown having the high intensity 302a, which is illustrated in a peak of the respective fluorescence signal, and the low intensity 302b, which is illustrated in a valley of the respective fluorescence signal. Similarly, the bottom particle is shown having the low intensity 304a, which is illustrated in a valley of the respective fluorescence signal, and the high intensity 304b, which is illustrated in a peak of the respective fluorescence signal.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways.

Each of these embodiments and obvious variations thereof is contemplated as falling within the spirit and scope of the claimed invention, which is set forth in the following claims.

What is claimed is:

1. A method of performing 3D photoactivation microscope imaging, the method comprising:
   (A) providing a sample having a plurality of probes, each of the plurality of probes including a photo-activatable material;
   (B) activating probes from the plurality of probes to form a sparse subset of probes, the sparse subset of probes having probes that are spatially separated by at least a microscope resolution;
   (C) illuminating the sample with readout light from a readout light source;
   (D) detecting light emission from activated probes of the sparse subset of probes; and
   (E) based on the light emission detected in (D), obtaining localized three-dimensional positions of the activated probes.

2. The method of claim 1, further comprising:
   (F) deactivating the activated probes;
   (G) repeating (B)-(F) for at least one more sparse subset of probes; and
   (H) based on the obtained localized three-dimensional positions of the activated probes, constructing a 3D image of the sample.

3. The method of claim 2, wherein the at least one more sparse subset of probes is selected from a different volume section of the sample than the sparse subset of probes.

4. The method of claim 1, wherein (B) is performed by establishing a coherent superposition of two counter-propagating light wavefronts via two opposing objective lenses.

5. The method of claim 1, wherein (C) is performed by illuminating the sample via two opposing objective lenses to establish a coherent superposition of two counter-propagating light wavefronts.

6. The method of claim 1, further comprising collecting the light emission from the activated probes in (D) via two opposing objective lenses.

7. The method of claim 6, further comprising combining the collected light emission from the activated probes in a coherent superposition before detection.

8. The method of claim 1, further comprising:
   (I) performing (B) by establishing a coherent superposition of two counter-propagating light wavefronts via two opposing objective lenses;
   (J) performing (C) by illuminating the sample via two opposing objective lenses to establish a coherent superposition of two counter-propagating light wavefronts;
   (K) collecting the light emission from the activated probes in (D) via two opposing objective lenses; and
   (L) combining the collected light emission from the activated probes in a coherent superposition before detection.

9. The method of claim 8, further comprising, after performing at least one of (I)-(L), shifting for different detection images an interference phase of at least one of the readout light and the detected light emission.

10. The method of claim 9, wherein the interference phase is shifted over several periods to filter out other signal-influencing effects including at least one of blinking and bleaching.

11. The method of claim 1, wherein an axial position of at least some probes of the activated sparse subset of probes is obtained at least partially by measuring a phase shift of interference phase modulation.

12. The method of claim 1, further comprising moving a piezo mirror to shift interference phase of the readout light between activation cycles to activate one or more probes of the plurality of probes.

13. The method of claim 1, further comprising moving the sample axially between activation cycles to activate probes on multiple lateral planes with different axial positions within the sample.

14. The method of claim 1, further comprising:
   modulating at least one of an illumination light pattern and a detection efficiency pattern in an axial direction;
   applying at least two different axial patterns for the sparse subset of probes;
   collecting images via a detector for each applied pattern; and
   locating in three-dimensions probes of the sparse subset of probes from the collected images.

15. A photoactivation microscope system configured to generate 3D images of a sample, the microscope comprising:
   an activation light source configured to activate probes of at least one probe subset, the probes being spatially separated by at least a microscope resolution and being selected from a plurality of photo-activatable probes within a sample;
   a readout light source configured to illuminate the sample with a readout light;
   a spatially resolving detector configured to detect light emission from activated probes; and
   a controller configured to construct a 3D image of the sample in accordance with localized three-dimensional positions of the activated probes, the localized three-dimensional positions being based on the detected light emission from the activated probes.

16. The photoactivation microscope system of claim 15, wherein the activation light source is a pulsed laser source, the readout light source is selected from a group consisting of a laser and a lamp, and the spatially resolving detector is a CCD camera.

17. The photoactivation microscope system of claim 15, wherein at least some of the plurality of photo-activatable probes are fluorescent molecules.

18. The photoactivation microscope system of claim 15, further comprising two opposing objective lenses configured to establish a coherent superposition of two counter-propagating light wavefronts of light from the activation light source.

19. The photoactivation microscope system of claim 15, wherein the activation light source is configured to activate the probes via a multiphoton absorption process.

20. The photoactivation microscope system of claim 19, wherein the photoactivation process depends non-linearly on intensity of the activation light source.

21. The photoactivation microscope system of claim 15, further comprising a stage for holding the sample, the stage being stationary during detection of the at least one probe subset.

22. The photoactivation microscope system of claim 15, further comprising a piezo mirror for controlling shifting of interference phase, the piezo mirror being the only movable component during detection of the at least one probe subset.

23. A method of performing 3D photoactivation microscope imaging, the method comprising:
 providing a sample having a plurality of probes, each of the plurality of probes including a photo-activatable material;
 activating a first subset of probes from the plurality of probes;
 illuminating the sample with a readout light source;
 detecting light emission from activated probes of the first subset of probes;
 obtaining a localized three-dimensional position for at least one of the activated probes of the first subset of probes to form a first detected image;
 deactivating the activated probes of the first subset of probes;
 activating a second subset of probes from the plurality of probes;
 detecting light emission from activated probes of the second subset of probes;
 obtaining a localized three-dimensional position for at least one of the activated probes of the second subset of probes to form a second detected image; and
 constructing a 3D image of the sample based on the first detected image and the second detected image.

24. The method of claim 23, wherein the first detected image is associated with a first interference phase and the second detected image is associated with a second interference phase.

25. The method of claim 23, further comprising measuring a phase shift of an interference phase modulation to obtain an axial position of at least one of the activated probes of the first subset of probes and the activated probes of the second subset of probes.

26. The method of claim 23, further comprising illuminating the sample via two opposing objective lenses to establish a coherent superposition of two counter-propagating light wavefronts.

27. The method of claim 23, further comprising:
 maintaining the sample stationary during the detecting of the light emission from the activated probes of the first subset of probes and the activated probes of the second subset of probes; and
 moving only a piezo mirror while detecting the first detected image and the second detected image.

* * * * *